F. YOUNG.
CULTIVATING TOOL.
APPLICATION FILED APR. 2, 1915.

1,187,222.

Patented June 13, 1916.

Witnesses:
Leonard E. Bogue
A. A. Olson

Inventor
Frank Young.
By Joshua R. H. Potts
His attorney.

UNITED STATES PATENT OFFICE.

FRANK YOUNG, OF PLATTEVILLE, WISCONSIN.

CULTIVATING-TOOL.

1,187,222.  Specification of Letters Patent.  Patented June 13, 1916.

Application filed April 2, 1915. Serial No. 18,779.

*To all whom it may concern:*

Be it known that I, FRANK YOUNG, a citizen of the United States, and a resident of the town of Platteville, county of Grant, and State of Wisconsin, have invented certain new and useful Improvements in Cultivating-Tools, of which the following is a specification.

My invention relates to improvements in cultivating tools, particularly designed for use in connection with the cultivation of corn and similar plants.

The object of my invention is the production of a tool of this character which will be of durable and economical construction and through the medium of which the manual cultivation of small plants may be readily and easily effected.

Other objects will appear hereinafter.

The invention consists in the combinations and arrangements of parts hereinafter described and claimed.

Figure 1:
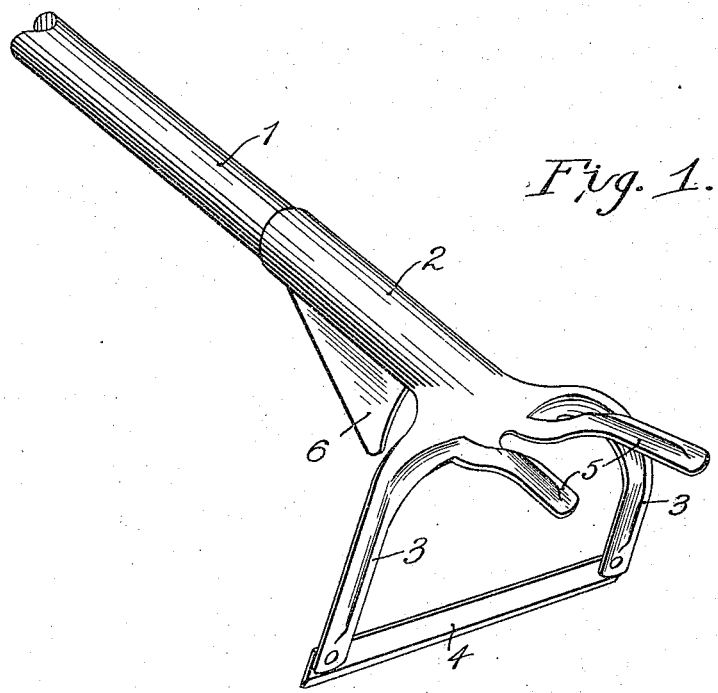
Figure 2:
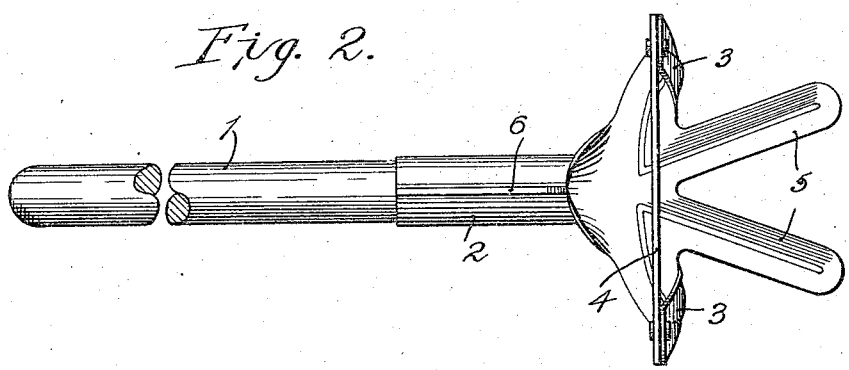

The invention will be best understood by reference to the accompanying drawing forming a part of this specification, and in which, Figure 1 is a perspective view of a cultivating tool embodying my invention, the rearward end of the handle being broken off, and Fig. 2 is a bottom plan view of the device.

The preferred form of construction, as illustrated in the drawing, comprises an elongated handle 1 upon the front end of which is mounted a socket member 2 formed of sheet metal. Formed integral with and projecting outwardly and downwardly from the front end of socket member 2 are two spaced arms 3 supporting at their lower ends a knife-edged blade 4 which is rigidly secured to said arms at its ends by riveting. Also formed integral with and projecting forwardly from the front end of the member 2 are two divergent fingers 5 the same being preferably of the curved formation shown and disposed at a slight upward inclination. For reinforcement, the arms 3 and fingers 5 are of ribbed formation.

In use, the blade 4 serves as a means of severing and hoeing the weeds which may be growing around the plant which is cultivated. To facilitate the severing operation, the blade 4 is knife-edged at its under side, as clearly shown in Fig. 1. The fingers 5 serve as comb members for removing earth or other foreign matter which may be thrown over the small plants in the cultivation thereof by machine cultivation. The tool is, of course, inverted in the employment of the fingers 5, and the latter are of divergent disposition in order to adapt the same to engage at opposite sides of the plant. The integral construction of the parts 2, 3 and 5 results in a construction which is economical of manufacture and which at the same time possesses great rigidity and firmness.

Formed upon the under side of the member 2 is a lip 6 which is adapted to serve as a stop or support to prevent sliding of the tool from engagement with a supporting bar upon which the front end thereof may be rested when the tool is not in use. The tool may be employed in connection with a cultivating machine, and in this case, when not in use, the front end thereof will be rested upon one of the many horizontal bars or rods of the machine, the lip 6 being adapted to engage with the bar or rod upon which the tool is rested to serve the purpose above mentioned.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A cultivator tool comprising a handle; a member mounted on the front end of said handle; a pair of spaced arms projecting from said member at substantially right angles to the axis of said handle; a blade supported by said arms; a pair of spaced fingers projecting forwardly from said member; and a stop lip on said member projecting from the same side thereof as said arms, substantially as described.

In testimony whereof I have signed my name to this specification in the presence of two subscribing witnesses.

FRANK YOUNG.

Witnesses:
W. J. BOLL,
M. S. BLOCK.